United States Patent
Hu et al.

(10) Patent No.: US 12,377,990 B2
(45) Date of Patent: Aug. 5, 2025

(54) LIP SKIN WITH HYDROPHOBIC AND HYDROPHLIC SURFACES FOR AN AIRCRAFT AEROSTRUCTURE

(71) Applicant: Rohr, Inc., Chula Vista, CA (US)

(72) Inventors: Xiaolan Hu, San Diego, CA (US); Katherine Urena Pimentel, Manchester, CT (US); Steven Poteet, Lake Forest, CA (US); David L. Rose, Cardiff By The Sea, CA (US)

(73) Assignee: ROHR, INC., Chula Vista, CA (US)

( * ) Notice: Subject to any disclaimer, the term of this patent is extended or adjusted under 35 U.S.C. 154(b) by 251 days.

(21) Appl. No.: 18/102,510

(22) Filed: Jan. 27, 2023

(65) Prior Publication Data
US 2024/0253790 A1    Aug. 1, 2024

(51) Int. Cl.
*B64D 15/00*     (2006.01)
*B64D 33/02*     (2006.01)
*F02C 7/047*     (2006.01)

(52) U.S. Cl.
CPC ............. *B64D 15/00* (2013.01); *F02C 7/047* (2013.01); *B64D 2033/0233* (2013.01); *F05D 2300/51* (2013.01); *F05D 2300/512* (2013.01)

(58) Field of Classification Search
CPC . B64D 2033/0233; B64D 15/00; F01D 25/02; F05D 2300/51; F05D 2300/512
See application file for complete search history.

(56) References Cited

U.S. PATENT DOCUMENTS

| 8,793,970 | B2 * | 8/2014 | Le Docte | B64D 33/02 60/39.093 |
| 9,199,741 | B2 * | 12/2015 | Sapper | C09K 3/18 |
| 10,214,293 | B2 | 2/2019 | Riquet | |
| 10,875,632 | B2 * | 12/2020 | Botura | B64D 15/00 |
| 12,091,160 | B2 * | 9/2024 | Guerry | B81B 7/02 |
| 12,104,526 | B2 * | 10/2024 | Riquet | B29C 59/16 |

(Continued)

FOREIGN PATENT DOCUMENTS

| CN | 107878748 B | 6/2019 |
| CN | 114933018 B | 5/2024 |

(Continued)

OTHER PUBLICATIONS

FR30358985B1 translation document.*
EP Search Report for EP Patent Application No. 24154449.3 dated May 27, 2024.

*Primary Examiner* — Arfan Y. Sinaki
(74) *Attorney, Agent, or Firm* — Getz Balich LLC

(57) ABSTRACT

An air inlet section for an aircraft propulsion system nacelle includes an outer skin, an inner skin, and a lip skin. The lip skin extends between and to an outer end and an inner end. The outer end is disposed at the outer skin. The inner end is disposed at the inner skin. The lip skin forms an exterior lip skin surface extending from the inner end to the outer end. The exterior lip skin surface forms a leading edge of the lip skin. The exterior lip skin surface includes an outer surface portion and an inner surface portion. The outer surface portion extends from the outer end to the inner surface portion. The outer surface portion forms a hydrophobic surface. The inner surface portion extends from the inner end to the outer surface portion. The inner surface portion forms a hydrophilic surface.

16 Claims, 6 Drawing Sheets

(56) References Cited

U.S. PATENT DOCUMENTS

| | | | | |
|---|---|---|---|---|
| 2015/0251767 A1* | 9/2015 | Sapper | ................... | B64D 15/00 |
| | | | | 244/134 E |
| 2015/0299503 A1* | 10/2015 | Carter | ...................... | B05D 7/54 |
| | | | | 427/407.1 |
| 2018/0009538 A1* | 1/2018 | Wilson | ................... | B64D 29/00 |
| 2020/0163160 A1* | 5/2020 | Gangloff, Jr. | ......... | B32B 27/283 |
| 2021/0156305 A1 | 5/2021 | Riquet | | |
| 2022/0388632 A1* | 12/2022 | Guerry | ................. | B81B 7/0029 |

FOREIGN PATENT DOCUMENTS

| | | | | | |
|---|---|---|---|---|---|
| EP | 2915747 | B1 | | 5/2018 | |
| FR | 3058985 | B1 * | 7/2019 | ............. | B08B 17/02 |

\* cited by examiner

LIP SKIN WITH HYDROPHOBIC AND HYDROPHLIC SURFACES FOR AN AIRCRAFT AEROSTRUCTURE

BACKGROUND

1. Technical Field

This disclosure relates generally to a lip skin for an aircraft aerostructure, and more particularly to a lip skin including a hydrophilic surface and a hydrophobic surface.

2. Background Information

Aircraft components such as propulsion system nacelles have leading edges on which ice may build-up during adverse weather and atmospheric conditions. Some known propulsion system components include leading-edge structures and anti-icing systems configured to prevent ice accumulation on the leading-edge structures and/or to remove accumulated ice from the leading-edge structures. Anti-icing systems may also be configured to reduce water and ice runback into the propulsion system. While these known leading-edge structures and anti-icing systems have various advantages, there is still room in the art for improvement.

SUMMARY

It should be understood that any or all of the features or embodiments described herein can be used or combined in any combination with each and every other feature or embodiment described herein unless expressly noted otherwise.

According to an aspect of the present disclosure, an air inlet section for an aircraft propulsion system nacelle includes an outer skin, an inner skin, and a lip skin. The outer skin forms an outer annular body extending circumferentially about an axial centerline of the aircraft propulsion system nacelle. The inner skin forms an inner annular body extending circumferentially about the axial centerline. The inner skin is disposed radially inward of the outer skin. The lip skin extends circumferentially about the axial centerline. The lip skin extends between and to an outer end and an inner end. The outer end is disposed at the outer skin. The inner end is disposed at the inner skin. The lip skin forms an exterior lip skin surface extending from the inner end to the outer end. The exterior lip skin surface forms a leading edge of the lip skin. The exterior lip skin surface includes an outer surface portion and an inner surface portion. The outer surface portion extends from the outer end to the inner surface portion. The outer surface portion forms a hydrophobic surface. The inner surface portion extends from the inner end to the outer surface portion. The inner surface portion forms a hydrophilic surface.

In any of the aspects or embodiments described above and herein, the hydrophilic surface may be disposed at the leading edge.

In any of the aspects or embodiments described above and herein, the hydrophilic surface may be disposed radially outward of the leading edge.

In any of the aspects or embodiments described above and herein, the air inlet section may further include a hydrophobic coating disposed on the outer surface portion. The hydrophobic coating may form the hydrophobic surface.

In any of the aspects or embodiments described above and herein, the lip skin may include a lip skin body material forming the exterior lip skin surface. The lip skin body material may have a first contact angle. The hydrophilic coating may have a second contact angle. The hydrophobic coating may have a third contact angle. The first contact angle may be greater than the second contact angle and less than the third contact angle.

In any of the aspects or embodiments described above and herein, the air inlet section may further include a hydrophilic coating disposed on the inner surface portion. The hydrophilic coating may form the hydrophilic surface.

In any of the aspects or embodiments described above and herein, the outer skin may form an exterior skin surface coincident with the exterior lip skin surface. At least a portion of the exterior skin surface may additionally form the hydrophobic surface.

In any of the aspects or embodiments described above and herein, the lip skin may include a lip skin body material forming the exterior lip skin surface and the lip skin body material may form the hydrophobic surface and the hydrophilic surface.

In any of the aspects or embodiments described above and herein, the lip skin body material may include a first surface treatment for the outer surface portion and a second surface treatment for the inner surface portion. The first surface treatment may form the hydrophobic surface and the second surface treatment may form the hydrophilic surface.

In any of the aspects or embodiments described above and herein, the lip skin body material may include aluminum.

According to another aspect of the present disclosure, an air inlet section for an aircraft propulsion system nacelle includes an outer skin, an inner skin, a lip skin, a hydrophobic coating, and a hydrophilic coating. The outer skin forms an outer annular body extending circumferentially about an axial centerline of the aircraft propulsion system nacelle. The inner skin forms an inner annular body extending circumferentially about the axial centerline. The inner skin is disposed radially inward of the outer skin. The lip skin extends circumferentially about the axial centerline. The lip skin extends between and to an outer end and an inner end. The outer end is disposed at the outer skin. The inner end is disposed at the inner skin. The lip skin forms an exterior lip skin surface extending from the inner end to the outer end. The exterior lip skin surface forms a leading edge of the lip skin. The hydrophobic coating is disposed on the exterior lip skin surface. The hydrophilic coating is disposed on the exterior lip skin surface.

In any of the aspects or embodiments described above and herein, the hydrophobic coating may be disposed on the exterior lip skin surface radially outward of the leading edge and the hydrophilic coating may be disposed on the exterior lip skin surface radially inward of the leading edge.

In any of the aspects or embodiments described above and herein, the outer skin may form an exterior skin surface coincident with the exterior lip skin surface. The hydrophobic coating may be disposed on the exterior skin surface.

In any of the aspects or embodiments described above and herein, the hydrophobic coating may extend along the exterior lip skin surface between and to a first outer radial end and a first inner radial end and the hydrophilic coating may extend along the exterior lip skin surface between and to a second outer radial end and a second inner radial end. The second outer radial end may be disposed at the first inner radial end.

In any of the aspects or embodiments described above and herein, the second outer radial end may be disposed radially outward of the leading edge.

According to another aspect of the present disclosure, an aerostructure for an aircraft includes an outer skin, an inner skin, and an arcuate lip skin. The arcuate lip skin extends between and to an outer end and an inner end. The outer end is disposed at the outer skin. The inner end is disposed at the inner skin. The arcuate lip skin forms an exterior lip skin surface extending from the inner end to the outer end. The exterior lip skin surface forms a leading edge of the lip skin. The exterior lip skin surface includes a hydrophobic surface and a hydrophilic surface.

In any of the aspects or embodiments described above and herein, the hydrophilic surface may be disposed at the leading edge.

In any of the aspects or embodiments described above and herein, the hydrophobic surface may extend between and to the hydrophilic surface and the outer end.

In any of the aspects or embodiments described above and herein, the hydrophobic surface may extend between and to the hydrophilic surface and the inner end.

In any of the aspects or embodiments described above and herein, the aerostructure may further include an anti-icing system disposed at the arcuate lip skin.

The present disclosure, and all its aspects, embodiments and advantages associated therewith will become more readily apparent in view of the detailed description provided below, including the accompanying drawings.

DETAILED DESCRIPTION

Figure 1:
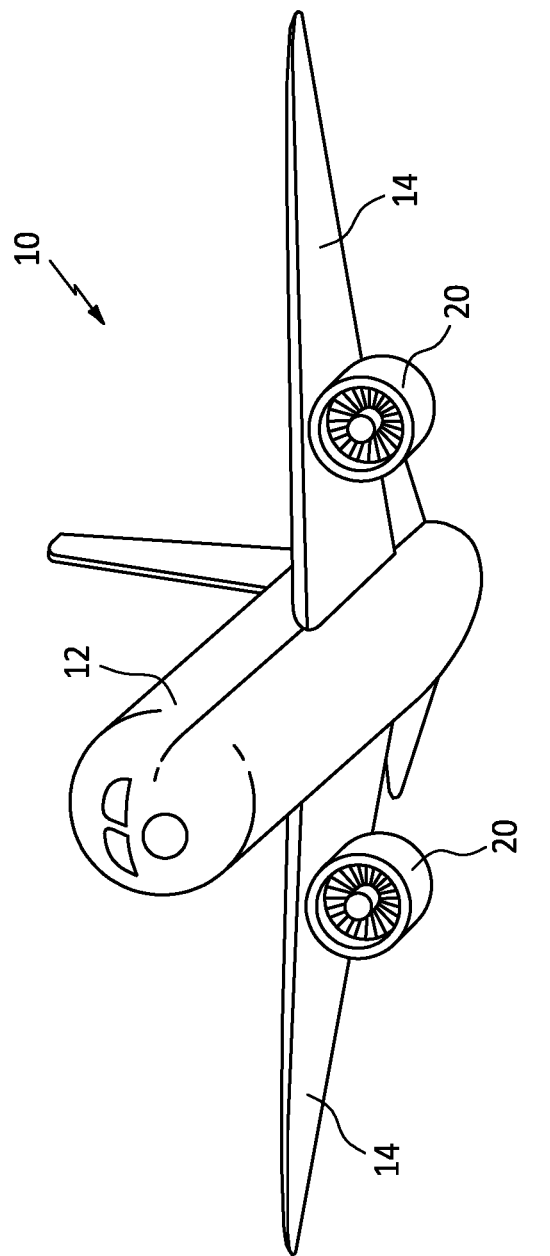
FIG. 1 illustrates a perspective view of an aircraft including propulsion systems, in accordance with one or more embodiments of the present disclosure.

FIG. 1 illustrates an aircraft 10 including propulsion systems 20. The aircraft 10 of FIG. 1 generally includes a fuselage 12 and wings 14 extending outward from the fuselage 12. Each of the propulsion systems 20 of FIG. 1 are mounted to and below a respective wing 14. The present disclosure, however, is not limited to any particular mounting configuration or quantity for the propulsion systems 20.

Figure 2:
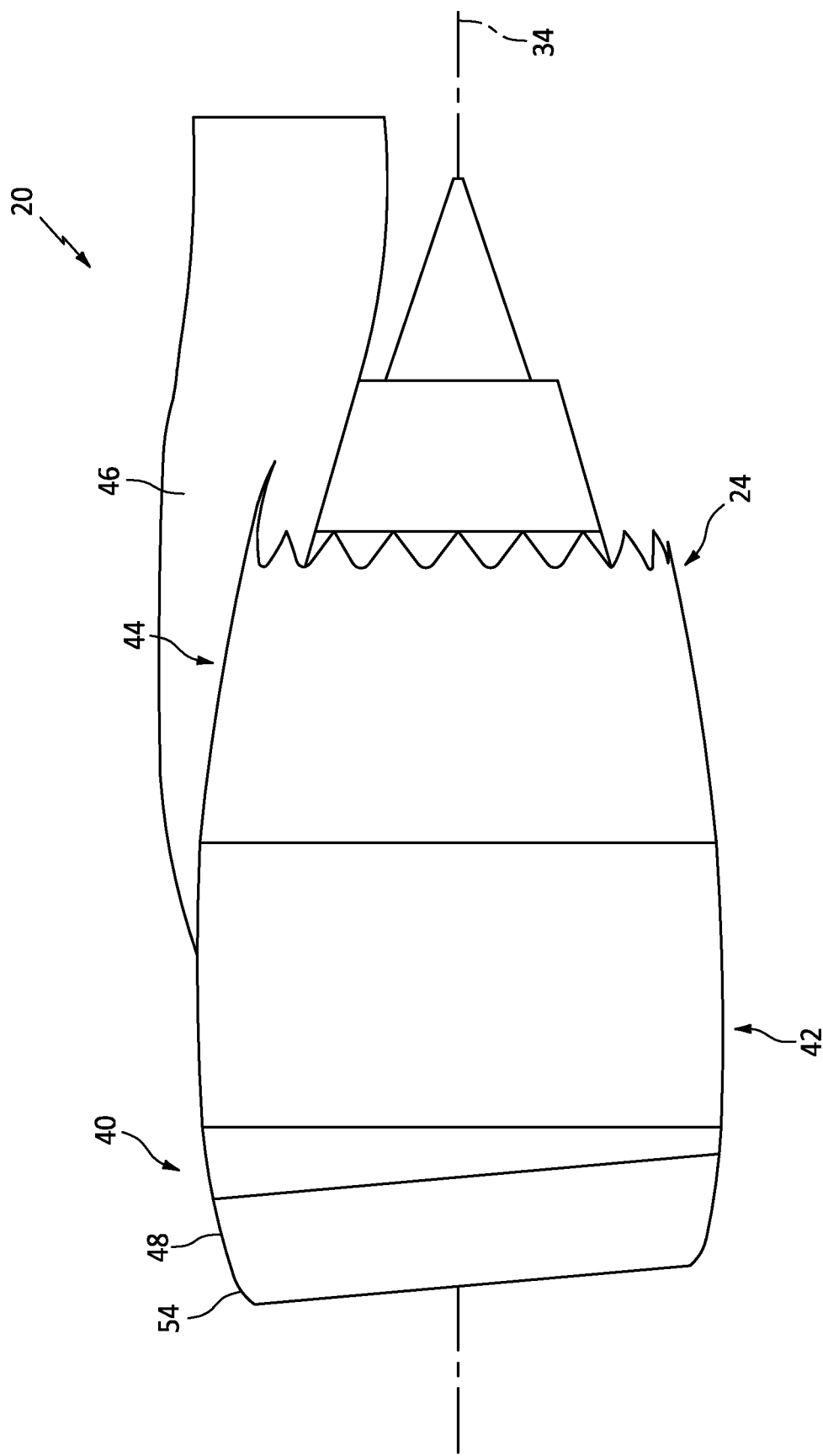
FIG. 2 illustrates a side view of an aircraft propulsion system, in accordance with one or more embodiments of the present disclosure.
Figure 3:
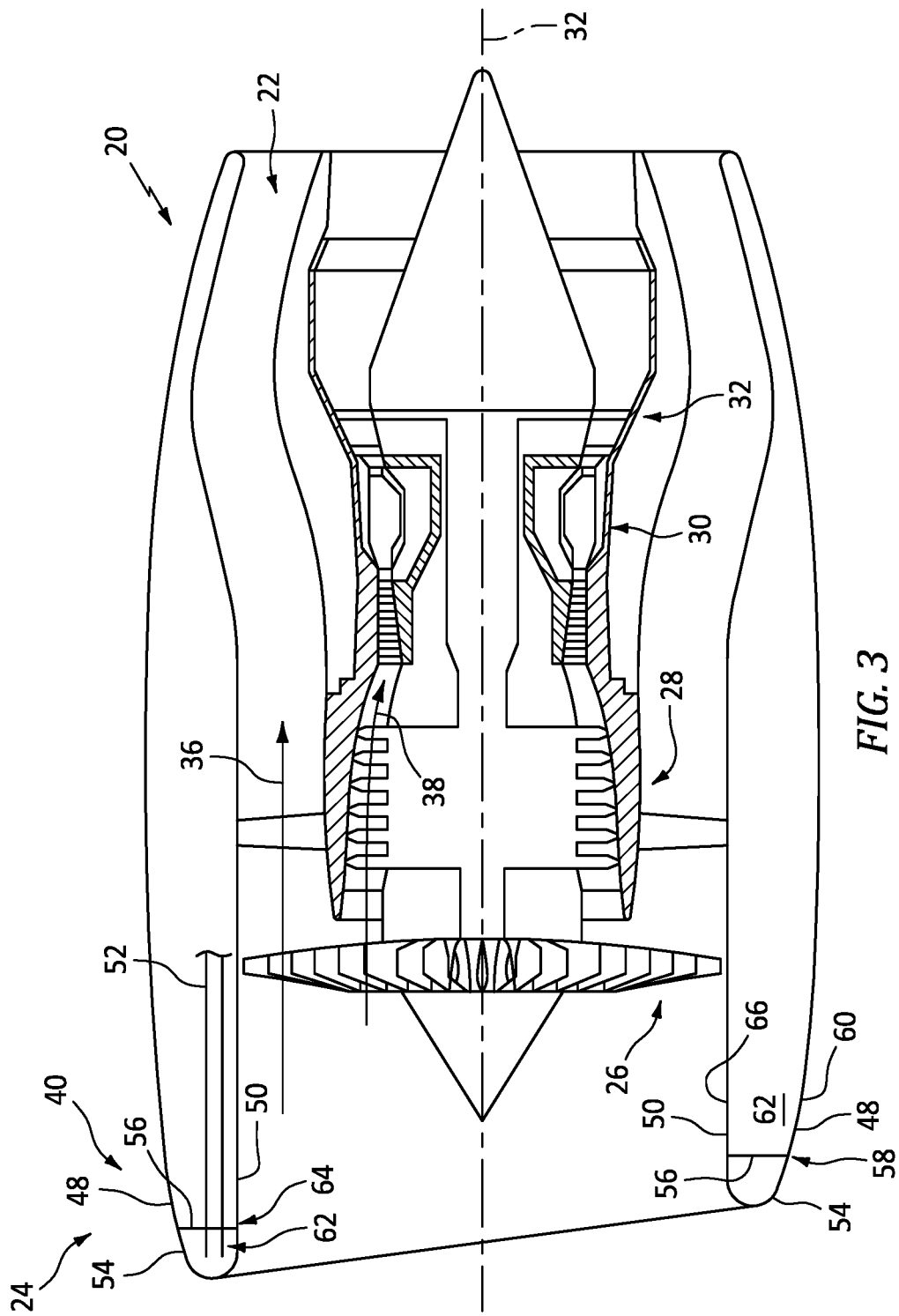
FIG. 3 illustrates a schematic, cutaway view of an aircraft propulsion system, in accordance with one or more embodiments of the present disclosure.

FIGS. 2 and 3 illustrate an exemplary configuration of the propulsion system 20. FIG. 2 illustrates a side, exterior view of the propulsion system 20. FIG. 3 illustrates a side, cutaway view of the propulsion system 20. The propulsion system 20 of FIGS. 2 and 3 includes a gas turbine engine 22 and a nacelle 24. The gas turbine engine 22 of FIGS. 2 and 3 is configured as a multi-spool, turbofan gas turbine engine. However, it should be understood that aspects of the present disclosure may be equally applicable to other configurations of gas turbine engines such as, but not limited to, a turboshaft gas turbine engine, a turboprop gas turbine engine, a turbojet gas turbine engine, a propfan gas turbine engine, an open rotor gas turbine engine, or the like. Aspects of the present disclosure may also be equally applicable to other types of aircraft propulsion systems which do not include gas turbine engines such as, but not limited to, an electric-fan propulsion system, an electric-prop propulsion system, or the like.

The gas turbine engine 22 of FIG. 2 includes a fan section 26, a compressor section 28 (e.g., including one or more bladed compressor rotors), a combustor section 30, and a turbine section 32 (e.g., including one or more bladed turbine rotors) extending sequentially along an axial centerline 34 of the propulsion system 20. The fan section 26 drives air along a bypass flow path 36 while the compressor section 28 drives air along a core flow path 38 for compression and communication into the combustor section 30 where the air is mixed with fuel and burned. Combustion gas from the combustor section 30 is directed through the turbine section 32. The turbine section 32 drives rotation of components of the fan section 26 and the compressor section 28 in response the combustion gas flow through the turbine section 32.

The nacelle 24 of FIGS. 2 and 3 is configured to house and provide an aerodynamic cover for the propulsion system 20. The nacelle 24 extends axially along the axial centerline 34. The nacelle 24 extends circumferentially about (e.g., completely around) the axial centerline 34 to surround the gas turbine engine 22 and form the bypass flow path 36.

The nacelle 24 of FIGS. 2 and 3 includes an air inlet section 40, a fan cowl section 42, a thrust reverser section 44, a pylon 46. The air inlet section 40, the fan cowl section 42, and the thrust reverser section 44 extend circumferentially about (e.g., completely around) the axial centerline 34. The air inlet section 40 forms an upstream (e.g., axially forward) end of the nacelle 24. The fan cowl section 42 may include one or more pivotable doors (e.g., cowl doors) configured to facilitate access to internal components of the propulsion system 20 and its gas turbine engine 22. The thrust reverser section 44 may form a downstream (e.g., axially aft) end of the nacelle 24. The thrust reverser section 44 may include one or more axially translatable or pivotable portions configured to facilitate deceleration of the aircraft 10 (see FIG. 1), for example, by directing combustion exhaust gas from the gas turbine engine 22 in an upstream (e.g., axially forward) direction. The pylon 46 is configured for mounting the propulsion system 20 to one of the wings 14 or another portion of the aircraft 10 (see FIG. 1).

The air inlet section 40 of FIGS. 2 and 3 includes an outer skin 48 (e.g., an outer barrel), an inner skin 50 (e.g., an inner barrel), an anti-icing system 52, and a lip skin 54. The air inlet section 40 may additionally include one or more bulkheads 56.

The outer skin 48 of FIGS. 2 and 3 forms an outer annular body extending circumferentially about (e.g., completely around) the axial centerline 34. The outer skin 48 includes a leading end 58 (e.g., an axially forward end) and an exterior surface 60. The exterior surface 60 forms a portion of the nacelle 24 exterior.

The inner skin 50 of FIG. 3 forms an inner annular body extending circumferentially about (e.g., completely around) the axial centerline 34. The inner skin 50 is disposed radially inward of the outer skin 48. The inner skin 50 is spaced (e.g., radially spaced) from the outer skin 48 to form a cavity 62 between the outer skin 48 and the inner skin 50. The inner skin 50 includes a leading end 64 (e.g., an axially forward end) and an interior surface 66. The interior surface 66 forms a portion of the bypass flow path 36 through the propulsion system 20.

FIG. 3 schematically illustrates a portion of the anti-icing system 52. The anti-icing system 52 of FIG. 3 is disposed, at least in part, in the cavity 62. During operation of the propulsion system 20 (e.g., during flight of the aircraft 10; see FIG. 1), atmospheric conditions may cause the formation and/or accumulation of ice on surfaces of the nacelle 24 such as, but not limited to, portions of the air inlet section 40 such as, but not limited to, the lip skin 54. The anti-icing system 52 is configured to direct thermal energy to portions of the air inlet section 40 thereby removing (e.g., melting) ice from air inlet section 40 surfaces (e.g., anti-icing) and/or preventing the formation and/or accumulation of ice on air inlet section 40 surfaces (e.g., de-icing). The anti-icing system 52 may be an electrical system configured, for example, to provide electrical resistance heating of the air inlet section 40. Alternatively, the anti-icing system 52 may be configured to direct hot, pressurized air (e.g., compressor bleed air from the compressor section 28) to the cavity 62. The anti-icing system 52 may include one or more conduits extending through the bulkhead 56 to direct the hot, pressurized air to the lip skin 54. The present disclosure, however, is not limited to the inclusion of the anti-icing system 52 or to any particular configuration of anti-icing system 52.

Figure 4:
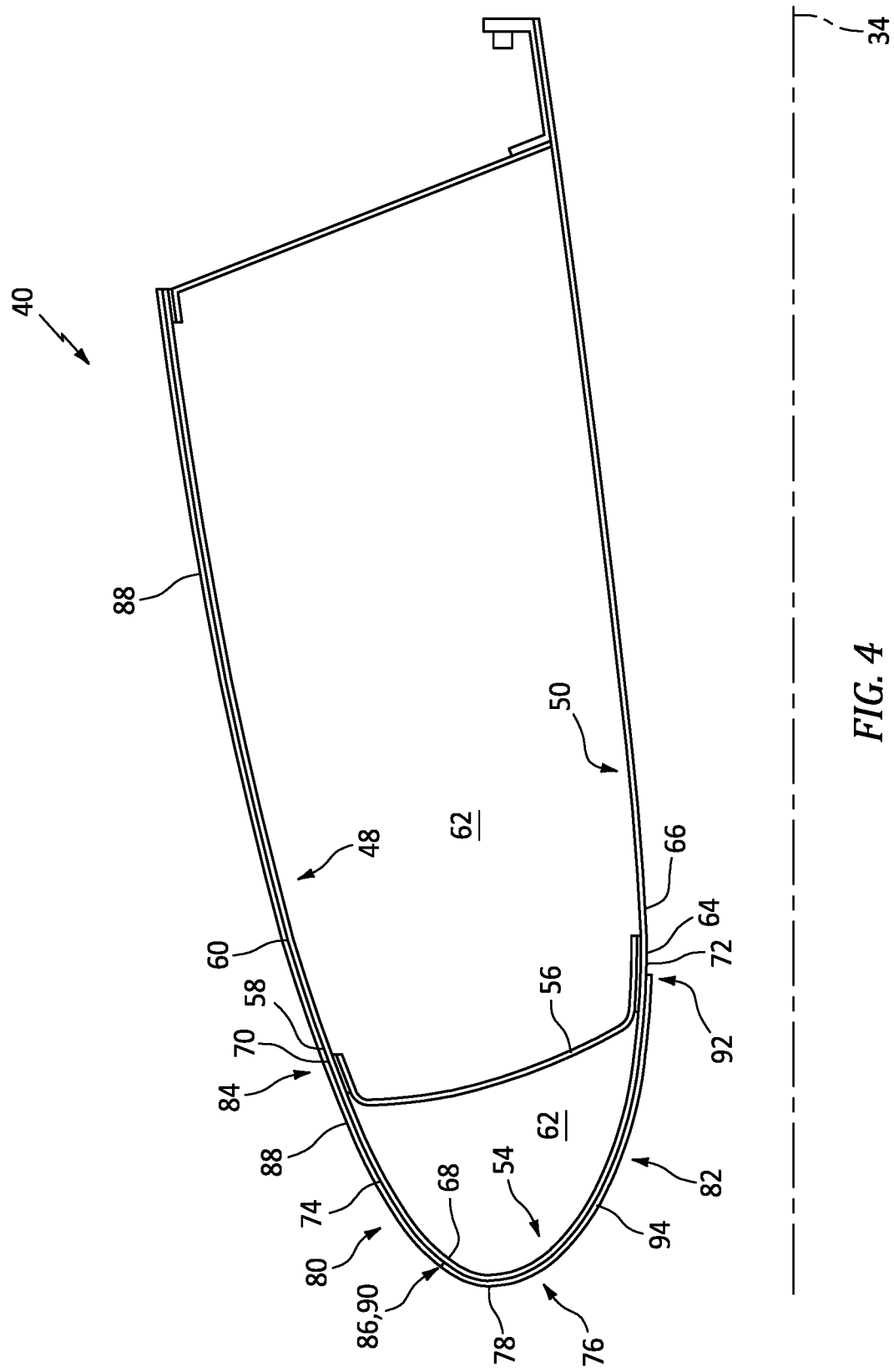
FIG. 4 illustrates a side, cutaway view of an air inlet section for an aircraft propulsion system nacelle, in accordance with one or more embodiments of the present disclosure.
Figure 5:
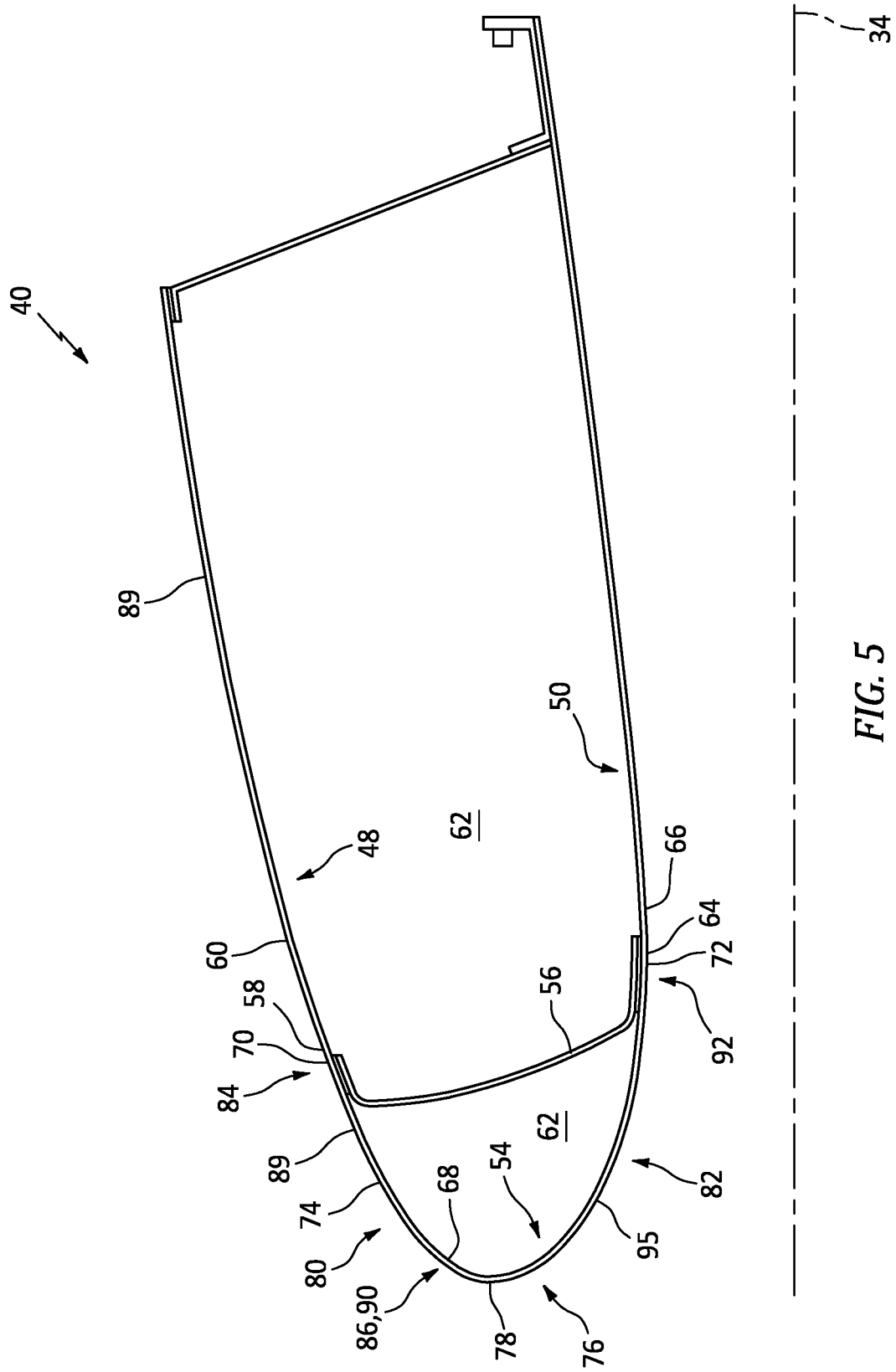
FIG. 5 illustrates a side, cutaway view of another air inlet section for an aircraft propulsion system nacelle, in accordance with one or more embodiments of the present disclosure.

FIGS. 4 and 5 illustrate side, cutaway views of a circumferential portion of the air inlet section 40 including the outer skin 48, the inner skin 50, and the lip skin 54. The air inlet section 40 of FIGS. 4 and 5 includes the bulkhead 56 (e.g., a forward bulkhead). The bulkhead 56 of FIGS. 4 and 5 extends circumferentially about (e.g., completely around) the axial centerline 34 and subdivides portions of the cavity 62. The present disclosure, however, is not limited to the inclusion of the bulkhead 56 or to any particular configuration of the bulkhead 56.

The lip skin 54 includes a lip skin body 68. The lip skin body 68 is configured as an arcuate, annular body extending circumferentially about (e.g., completely around) the axial centerline 34. The lip skin body 68 extends between and to an outer end 70 (e.g., an outer radial end) of the lip skin body 68 and an inner end 72 (e.g., an inner radial end) of the lip skin body 68. The outer end 70 is disposed at (e.g., on, adjacent, or proximate) or otherwise mounted to the outer skin 48 (e.g., the leading end 58). The inner end 72 is disposed at (e.g., on, adjacent, or proximate) or otherwise mounted to the inner skin 50 (e.g., the leading end 64). The lip skin body 68 forms an exterior surface 74. The exterior surface 74 extends from the outer end 70 to the inner end 72. The exterior surface 74 extends circumferentially about (e.g., completely around) the axial centerline 34. The exterior surface 74 may be disposed coincident with the exterior surface 60 and/or the interior surface 66. The lip skin body 68 further forms a portion (e.g., an axially-forward portion) of the cavity 62.

The lip skin body 68 includes a lip skin body material. The lip skin body material may form all or a substantial portion of the lip skin body 68. The lip skin body material may be a metal or metal alloy such as, but not limited to, aluminum or titanium. The present disclosure, however, is not limited to the use of a metal or metal alloy for the lip skin body material.

The lip skin 54 forms a lip skin surface 76. The lip skin surface 76 extends from the outer end 70 to the inner end 72. The lip skin surface 76 extends circumferentially about (e.g., completely around) the axial centerline 34. The lip skin surface 76 may be formed all or in part by the exterior surface 74. However, as will be discussed in further detail, the lip skin surface 76 is not limited to being formed all or in part by the exterior surface 74. The lip skin surface 76 forms a leading edge 78 (e.g., an axially forwardmost end; sometimes referred to as a "highlight") of the lip skin 54. The lip skin surface 76 includes an outer surface portion 80 and an inner surface portion 82. The outer surface portion 80 may form a hydrophobic surface. The inner surface portion 82 may form a hydrophilic surface.

In general, a surface may be understood to be a hydrophobic surface if it tends not to adsorb water or not to be wetted by water. In contrast, a surface may be understood to be a hydrophilic surface if it tends to adsorb water or to be wetted by water. The static (e.g., equilibrium) water contact angle $\theta$ (hereinafter "contact angle $\theta$") for a surface may be used to identify whether that surface is hydrophobic or hydrophilic. The contact angle $\theta$ is the angle at which the liquid-vapor interface for a water droplet intersects the solid surface. As used herein, a surface is "hydrophobic" where the contact angle $\theta$ for the surface is greater than ninety degrees (90°). The term "hydrophobic," as used herein, includes surfaces which may be understood as "superhydrophobic," such as those surfaces exhibiting a contact angle $\theta$ of greater than 150 degrees (150°). As used herein, a surface is "hydrophilic" where the contact angle $\theta$ for the surface is less than ninety degrees (90°). The term "hydrophilic," as used herein, includes surfaces which may be understood as "superhydrophilic," such as those surfaces exhibiting a contact angle $\theta$ of less than ten degrees (10°).

The outer surface portion 80 extends (e.g., in the arcuate direction of the lip skin body 68) from the outer end 70 to the inner surface portion 82. In particular, the outer surface portion 80 extends between and to an outer end 84 (e.g., an outer radial end) of the outer surface portion 80 and an inner end 86 (e.g., an inner radial end) of the outer surface portion 80. The outer end 84 may be disposed at (e.g., on, adjacent, or proximate) the outer end 70. The inner end 86 may be disposed at (e.g., on, adjacent, or proximate) or radially outward of the leading edge 78.

The outer surface portion 80 may be formed by a hydrophobic coating 88 disposed (e.g., deposited) on the exterior surface 74, as shown in FIG. 4. For example, the hydrophobic coating 88 may be disposed on all or a substantial portion of the exterior surface 74 which is coincident with the outer surface portion 80. The hydrophobic coating 88 may additionally be disposed on all or portions of the exterior surface 60. For example, the hydrophobic coating 88 may be disposed on portions of the exterior surface 60 at (e.g., on, adjacent, or proximate) the outer surface portion 80 so as to form a continuous or substantially continuous hydrophobic surface. The hydrophobic coating 88 may have a contact angle $\theta$ which is greater than the contact angle $\theta$ of the lip skin body material forming the exterior surface 74 on which the hydrophobic coating 88 is disposed. The hydrophobic surface of the outer surface portion 80 may have a contact angle $\theta$ which is greater than ninety degrees (90°) or, more preferably, greater than ninety-five degrees (95°). For example, the hydrophobic coating 88 may have a contact angle $\theta$ between ninety-five degrees (95°) and one hundred degrees (100°). However, neither the hydrophobic surface of the outer surface portion 80 nor the hydrophobic coating 88 is limited to any particular contact angle $\theta$ in general or relative to the lip skin body material. Examples of hydrophobic coating 88 materials include, but are not limited to, silicone polymers, polyurethane polymers, sol-gels (e.g., $SiO_2$, $TiO_2$, etc.) containing silicone polymers, fluorinated materials such as fluorourethanes, and the like. The hydrophobic coating 88 may prevent or reduce the occurrence of lip skin body material (e.g., aluminum) oxidation and corrosion. The hydrophobic coating 88 may reduce the accumulation or formation of ice, debris, residue (e.g., insect residue), or other contaminants on the outer surface portion 80 and/or portions of the exterior surface 60. Accordingly, the hydrophobic coating 88 may facilitate laminar air flow along the outer surface portion 80 and/or portions of the exterior surface 60, thereby reducing aerodynamic drag for the nacelle 24 as well as maintenance (e.g., cleaning) for the nacelle 24.

Alternatively, all or portions of the hydrophobic surface of the outer surface portion 80 may be formed by the exterior surface 74 and without the hydrophobic coating 88, as shown in FIG. 5. For example, the exterior surface 74 may include a surface treatment 89 including a surface texture (e.g., a lotus surface texture) exhibiting hydrophobic or superhydrophobic properties. This hydrophobic surface texture may be formed, for example, by microstructure patterns (e.g., cone or pillar microstructures) machined, etched, or otherwise formed on the exterior surface 60 (e.g., using a femtosecond pulsed laser process). The hydrophobic surface treatment 89 may be disposed on all or a substantial portion of the exterior surface 74 which is coincident with the outer surface portion 80. The hydrophobic surface treatment 89 may additionally be disposed on all or portions of the exterior surface 60. For example, the surface treatment 89 may be disposed on portions of the exterior surface 60 at (e.g., on, adjacent, or proximate) the outer surface portion 80 so as to form a continuous or substantially continuous hydrophobic surface.

The inner surface portion 82 extends (e.g., in the arcuate direction of the lip skin body 68) from the inner end 72 to the outer surface portion 80. In particular, the inner surface portion 82 extends between and to an outer end 90 (e.g., an outer radial end) of the inner surface portion 82 and an inner end 92 (e.g., an inner radial end) of the inner surface portion 82. The outer end 90 may be disposed at (e.g., on, adjacent, or proximate) or radially outward of the leading edge 78. The inner end 92 may be disposed at (e.g., on, adjacent, or proximate) the inner end 72.

The inner surface portion 82 may be formed by a hydrophilic coating 94 disposed (e.g., deposited) on the exterior surface 74. For example, the hydrophilic coating 94 may be disposed on all or a substantial portion of the exterior surface 74 which is coincident with the inner surface portion 82. The hydrophilic coating 94 may have a contact angle θ which is less than the contact angle θ of the lip skin body material forming the exterior surface 74 on which the hydrophilic coating 94 is disposed. The hydrophilic surface of the inner surface portion 82 may have a contact angle θ which is less than ninety degrees (90°) or, more preferably, less than eighty-five degrees (85°). For example, the hydrophilic coating 94 may have a contact angle θ between 60 degrees (60°) and eighty-five degrees (85°). However, neither the hydrophilic surface of the inner surface portion 82 nor the hydrophilic coating 94 is limited to any particular contact angle θ in general or relative to the lip skin body material. Examples of hydrophilic coating 94 materials include, but are not limited to, sol-gels including metal oxides which readily form hydrates, hydrogels formed from polyvinyl alcohol (PVA), polyethylene glycol (PEG), polyacrylamide (PAAm), and polypyrrole (PPy), polymer coatings including polyvinyl alcohol (PVA), polyethylene glycol (PEG), polyacrylamide (PAAm), and polypyrrole (PPy), and the like.

Alternatively, all or portions of the hydrophilic surface of the inner surface portion 82 may be formed by the exterior surface 74 and without the hydrophilic coating 94, as shown in FIG. 5. For example, the exterior surface 74 may include a surface treatment 95 exhibiting hydrophilic properties. This hydrophilic surface treatment 95 may include an oxide layer (e.g., an aluminum oxide layer) configured to promote hydrogen-oxygen bonding between the oxide layer and water in contact with the oxide layer. The oxide layer may be formed, for example, using a plasma treatment, an ultraviolet (UV) treatment, or another suitable technique for forming an oxide layer on the lip skin body material (e.g., at the exterior surface 74). The hydrophilic surface treatment 95 may be disposed on all or a substantial portion of the exterior surface 74 which is coincident with the inner surface portion 82.

Like the hydrophobic coating 88, the hydrophilic coating 94 may prevent or reduce the occurrence of lip skin body material (e.g., aluminum) oxidation and corrosion. However, we have discovered that a hydrophobic coating applied to portions of the lip skin at and/or radially inward of the leading edge, as with at least some conventional air inlets of which we are aware, may cause reduced contact area between water droplets on inner lip skin surfaces as well as faster movement of water along the inner lip skin surfaces, thereby reducing the effectiveness and the amount of time for which the thermal energy provided by an anti-icing system may act on the water droplets on the inner lip skin surfaces. As a result, a greater amount of water from the inner lip skin surfaces, and entrained ice, debris, residue, or other contaminants, may be carried into the associated propulsion assembly (e.g., a gas turbine engine air inlet) by ambient air. In other words, the hydrophobic coating may negatively impact anti-icing performance. In contrast, the hydrophilic coating 94 of the present disclosure may increase the contact area between water droplets and the inner surface portion 82 of the lip skin surface 76, thereby increasing the effectiveness of the anti-icing system 52 to act (e.g., by applying thermal energy to the lip skin 54) on the water and/or ice disposed on the inner surface portion 82. The improved effectiveness of the anti-icing system 52 may, in turn, facilitate a reduction in energy required for anti-icing, thereby reducing propulsion system 20 energy (e.g., fuel) consumption (see FIGS. 1-3). During some operating conditions of a propulsion system (e.g., air speed, attitude, wind speed and direction, etc.), water, ice, debris, residue, or other contaminants disposed radially outward of and in proximity to a lip skin leading edge may still be carried into the associated propulsion assembly. As previously discussed, the inner surface portion 82 forming the hydrophilic surface may extend to the outer end 90 disposed radially outward of the leading edge 78, thereby increasing the effectiveness of the anti-icing system 52 for portions of the lip skin 54 radially outward of the leading edge 78 as well.

Figure 6:
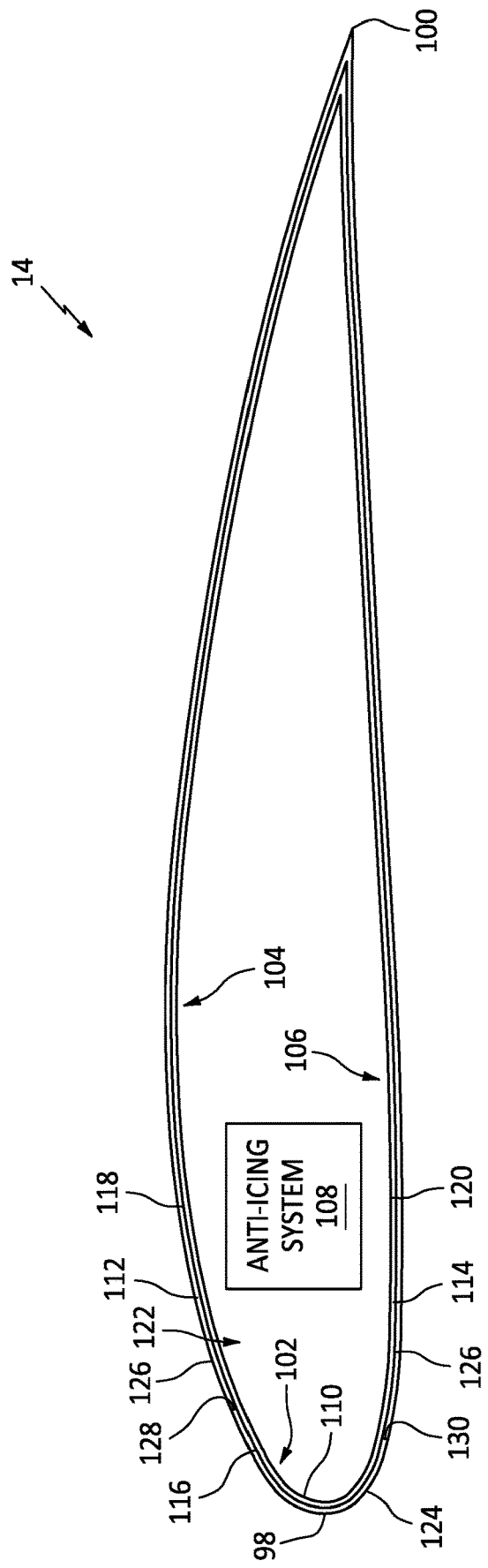
FIG. 6 illustrates a side, cutaway view of a portion of an aerostructure for an aircraft, in accordance with one or more embodiments of the present disclosure.

Referring now to FIG. 6, the aspects of the present disclosure may also be applicable to other aerostructures (e.g., all or portions of an airframe) for an aircraft such as, but not limited to, the wings, the fuselage, and/or the control surfaces of the aircraft as well as the nacelle 24 of the propulsion system(s) 20. As an example of an aerostructure, FIG. 6 illustrates a side, cutaway view of a portion of one of the wings 14 for the aircraft 10 (see FIG. 1).

The wing 14 of FIG. 6 extends (e.g., laterally extends) between and to a leading edge 98 of the wing 14 and a trailing edge 100 of the wing 14. The leading edge 98 is disposed at (e.g., on, adjacent, or proximate) an upstream end of the wing 14 and the trailing edge 100 is disposed at (e.g., on, adjacent, or proximate) a downstream end of the wing 14. The wing 14 generally includes a lip skin 102, an outer skin 104, an inner skin 106, and an anti-icing system 108. While discussed as separate components, two or more of the lip skin 102, the outer skin 104, and the inner skin 106 may be configured as a unitary component.

The lip skin 102 includes a lip skin body 110. The lip skin body 110 is configured as an arcuate, longitudinally-extending body. The lip skin body 110 extends between and to an outer end 112 of the lip skin body 110 (e.g., an upper vertical end) and an inner end 114 (e.g., a lower vertical end) of the lip skin body 110. The lip skin body 110 forms an exterior surface 116. The exterior surface 116 extends (e.g., in the arcuate direction of the lip skin body 110) from the outer end 112 to the inner end 114. The exterior surface 116 forms the leading edge 98, with the leading edge 98 positioned between (e.g., vertically between) the outer end 112 and the inner end 114.

The outer skin 104 is disposed at (e.g., on, adjacent, or proximate) the lip skin 102 (e.g., the outer end 112). The outer skin 104 extends (e.g., laterally extends) from the lip skin 102 to the trailing edge 100. The outer skin 104 may be configured as one or more panels extending (e.g., longitudinally extending) along the lip skin 102 and the trailing edge 100. The outer skin 104 forms an exterior surface 118 which is disposed coincident with the exterior surface 116.

The inner skin 106 is disposed at (e.g., on, adjacent, or proximate) the lip skin 102 (e.g., the inner end 114). The inner skin 106 extends (e.g., laterally extends) from the lip skin 102 to the trailing edge 100. The inner skin 106 is connected to the outer skin 104 at the trailing edge 100. The inner skin 106 may be configured as one or more panels extending (e.g., longitudinally extending) along the lip skin 102 and the trailing edge 100. The inner skin 106 forms an exterior surface 120 which is disposed coincident with the exterior surface 116. The lip skin 102, the outer skin 104, and the inner skin 106 may form a cavity 122 of the wing 14.

Each of the lip skin 102, the outer skin 104, and the inner skin 106 includes a respective aerostructure body material which may form all or a substantial portion of the respective lip skin 102, outer skin 104, and inner skin 106. The aerostructure body material may be a metal or metal alloy such as, but not limited to, aluminum or titanium. The present disclosure, however, is not limited to the use of a metal or metal alloy for the aerostructure body material. The aerostructure body material for each of the lip skin 102, the outer skin 104, and the inner skin 106 may be the same as or different than for the others of lip skin 102, the outer skin 104, and the inner skin 106.

FIG. 6 schematically illustrates a portion of the anti-icing system 108. The anti-icing system 108 is disposed, at least in part, in the cavity 122. For example, the anti-icing system 108 may be disposed at (e.g., on, adjacent, or proximate) the lip skin 102. During operation of the aircraft 10 (e.g., during flight; see FIG. 1), atmospheric conditions may cause the formation and/or accumulation of ice on surfaces of the wing 14 such as, but not limited to, portions of the lip skin 102, the outer skin 104, and the inner skin 106. The anti-icing system 108 is configured to direct thermal energy to portions of the lip skin 102, the outer skin 104, and the inner skin 106, and particularly in proximity to the leading edge 98, thereby removing (e.g., melting) ice from wing 14 surfaces (e.g., anti-icing) and/or preventing the formation and/or accumulation of ice on wing 14 surfaces (e.g., de-icing). The anti-icing system 108 may be an electrical system configured, for example, to provide electrical resistance heating of the wing 14. Alternatively, the anti-icing system 108 may be configured to direct hot, pressurized air (e.g., compressor bleed air from the compressor section 28 of the propulsion system 20) to the cavity 122. The present disclosure, however, is not limited to the inclusion of the anti-icing system 108 or to any particular configuration of anti-icing system 108.

The wing 14 may further include a hydrophilic coating 124 and a hydrophobic coating 126 which may be the same as or similar to the hydrophilic coating 94 and the hydrophobic coating 88, respectively, described above. The hydrophilic coating 124 may be disposed (e.g., deposited) on surfaces of the wing 14 at (e.g., on, adjacent, or proximate) the leading edge 98. For example, the hydrophilic coating 124 may be disposed on all or a substantial portion of the exterior surface 116. The hydrophilic coating 124 may additionally be disposed on portions of the exterior surface 118 and/or the exterior surface 120 and, particularly, in proximity to the lip skin 102. The hydrophilic coating 124 may extend along the exterior surface 116, the exterior surface 118, and/or the exterior surface 120 between and to an outer end 128 (e.g., an upper vertical end) of the hydrophilic coating 124 to an inner end 130 (e.g., a lower vertical end) of the hydrophilic coating 124. The hydrophilic coating 124 may have a contact angle θ which is less than the contact angle θ of the aerostructure body material forming the exterior surface 116, the exterior surface 118, and/or the exterior surface 120 on which the hydrophilic coating 124 is disposed. However, the hydrophilic coating 124 is not limited to any particular contact angle θ relative to the aerostructure body material. Alternatively, a hydrophilic surface of the wing 14 (e.g., at the leading edge 98) may be formed by a hydrophilic surface treatment (not shown) which is the same as or similar to the hydrophilic surface treatment 95 previously discussed.

The hydrophobic coating 126 may be disposed (e.g., deposited) on surfaces of the wing 14 which are not otherwise covered by the hydrophilic coating 124. For example, the hydrophobic coating 126 may be disposed (e.g., deposited) on portions of the exterior surface 116 and/or the exterior surface 118 so as to extend in a downstream direction from the outer end 128 toward or to the trailing edge 100. Similarly, the hydrophobic coating 126 may be disposed (e.g., deposited) on portions of the exterior surface 116 and/or the exterior surface 120 so as to extend in a downstream direction from the inner end 130 toward or to the trailing edge 100. The hydrophobic coating 126 may have a contact angle θ which is greater than the contact angle θ of the aerostructure body material forming the exterior surface 116, the exterior surface 118, and/or the exterior surface 120 on which the hydrophobic coating 126 is disposed. However, the hydrophobic coating 126 is not limited to any particular contact angle θ relative to the aerostructure body material. Alternatively, a hydrophobic surface of the wing 14 may be formed by a hydrophobic surface treatment (not shown) which is the same as or similar to the hydrophilic surface treatment 89 previously discussed.

The hydrophilic coating 124 and the hydrophobic coating 126 may prevent or reduce the occurrence of aerostructure body material (e.g., aluminum) oxidation and corrosion. As previously discussed, the hydrophilic coating 124 may also improving the effectiveness of the anti-icing system 108 for portions of the lip skin 102, the outer skin 104, and/or the inner skin 106 coated by the hydrophilic coating 124. Accordingly, the hydrophilic coating 124 may facilitate a reduction in the portions (e.g., surface area) of the lip skin 102, the outer skin 104, and/or the inner skin 106 for which heating from the anti-icing system 108 may be provided. The hydrophobic coating 126 may be disposed on portions of the lip skin 102, the outer skin 104, and/or the inner skin 106 which do not receive substantial thermal energy from the anti-icing system 108. As previously discussed, the hydrophobic coating 126 may facilitate laminar air flow along the portions of the lip skin 102, the outer skin 104, and/or the inner skin 106 coated by the hydrophobic coating 126, thereby reducing aerodynamic drag for the wing 14 as well as maintenance (e.g., cleaning) for the wing 14.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

What is claimed is:

1. An air inlet section for an aircraft propulsion system nacelle, the air inlet section comprising:
    an outer skin forming an outer annular body extending circumferentially about an axial centerline of the aircraft propulsion system nacelle;
    an inner skin forming an inner annular body extending circumferentially about the axial centerline, and the inner skin is disposed radially inward of the outer skin; and
    a lip skin extending circumferentially about the axial centerline, the lip skin extends between and to an outer end and an inner end, the outer end is disposed at the outer skin, the inner end is disposed at the inner skin, the lip skin forms an exterior lip skin surface extending from the inner end to the outer end, the exterior lip skin surface forms a leading edge of the lip skin, the exterior lip skin surface includes an outer surface portion and an inner surface portion, the outer surface portion extends from the outer end to the inner surface portion, the outer surface portion forms a hydrophobic surface, the inner surface portion extends from the inner end to the outer surface portion, the inner surface portion forms a hydrophilic surface, the hydrophilic surface disposed at the leading edge, and the hydrophilic surface extends between and to the hydrophobic surface and the inner end.

2. The air inlet section of claim 1, wherein the hydrophilic surface is disposed radially outwardly of the leading edge.

3. The air inlet section of claim 2, further comprising a hydrophobic coating disposed on the outer surface portion, and the hydrophobic coating forms the hydrophobic surface.

4. The air inlet section of claim 3, wherein:
    a hydrophilic coating is disposed on the inner surface portion, and the hydrophilic coating forms the hydrophilic surface;
    the lip skin includes a lip skin body material forming the exterior lip skin surface;
    the lip skin body material has a first contact angle, the hydrophilic coating has a second contact angle, and the hydrophobic coating has a third contact angle; and
    the first contact angle is greater than the second contact angle and less than the third contact angle.

5. The air inlet section of claim 1, further comprising a hydrophilic coating disposed on the inner surface portion, and the hydrophilic coating forms the hydrophilic surface.

6. The air inlet section of claim 1, wherein the outer skin forms an exterior skin surface coincident with the exterior lip skin surface, and at least a portion of the exterior skin surface additionally forms the hydrophobic surface.

7. The air inlet section of claim 1, wherein:
the lip skin includes a lip skin body material forming the exterior lip skin surface; and
the lip skin body material forms the hydrophobic surface and the hydrophilic surface.

8. The air inlet section of claim 7, wherein the lip skin body material includes a first surface treatment for the outer surface portion and a second surface treatment for the inner surface portion, the first surface treatment forms the hydrophobic surface, and the second surface treatment forms the hydrophilic surface.

9. The air inlet section of claim 8, wherein the lip skin body material includes aluminum.

10. An air inlet section for an aircraft propulsion system nacelle, the air inlet section comprising:
an outer skin forming an outer annular body extending circumferentially about an axial centerline of the aircraft propulsion system nacelle;
an inner skin forming an inner annular body extending circumferentially about the axial centerline, and the inner skin is disposed radially inward of the outer skin;
a lip skin extending circumferentially about the axial centerline, the lip skin extends between and to an outer end and an inner end, the outer end is disposed at the outer skin, the inner end is disposed at the inner skin, the lip skin forms an exterior lip skin surface extending from the inner end to the outer end, the exterior lip skin surface forms a leading edge of the lip skin;
a hydrophobic coating disposed on the exterior lip skin surface radially outward of the leading edge; and
a hydrophilic coating disposed on the exterior lip skin surface radially inward of the leading edge.

11. The air inlet section of claim 10, wherein the outer skin forms an exterior skin surface coincident with the exterior lip skin surface, and the hydrophobic coating is disposed on the exterior skin surface.

12. The air inlet section of claim 10, wherein:
the hydrophobic coating extends along the exterior lip skin surface between and to a first outer radial end and a first inner radial end; and
the hydrophilic coating extends along the exterior lip skin surface between and to a second outer radial end and a second inner radial end, the second outer radial end disposed at the first inner radial end.

13. The air inlet section of claim 12, wherein the second outer radial end is disposed radially outward of the leading edge.

14. An aerostructure for an aircraft, the aerostructure comprising:
an outer skin;
an inner skin; and
an arcuate lip skin extending between and to an outer end and an inner end, the outer end is disposed at the outer skin, the inner end is disposed at the inner skin, the arcuate lip skin forms an exterior lip skin surface extending from the inner end to the outer end, the exterior lip skin surface forms a leading edge of the arcuate lip skin, the exterior lip skin surface includes a hydrophobic surface and a hydrophilic surface, the hydrophilic surface disposed at the leading edge, and the hydrophobic surface extending between and to the hydrophilic surface and the outer end.

15. The aerostructure of claim 14, wherein the hydrophilic surface extends between and to the hydrophobic surface and the inner end.

16. The aerostructure of claim 14, further comprising an anti-icing system disposed at the arcuate lip skin.

\* \* \* \* \*